United States Patent Office.

SAMUEL I. RUSSELL AND JAMES H. COLE, OF CHICAGO, ILLINOIS.

Letters Patent No. 93,482, dated August 10, 1869.

IMPROVED ROOFING-COMPOSITION.

The Schedule referred to in these Letters Patent and making part of the same.

*To all whom it may concern:*

Be it known that we, SAMUEL I. RUSSELL and JAMES H. COLE, both of the city of Chicago, in the State of Illinois, have invented or discovered a certain new and useful "Roofing-Composition;" and we do hereby declare that the following is a full, clear, and exact description of the same, and the mode of preparing it, sufficient to enable others skilled in the art to make and use it.

In manufacturing our composition, we use the following ingredients, viz: coal-tar, rosin, clay, slaked lime, gypsum, and fine sand.

We first mix the coal-tar and rosin together, heating the same, using about twenty-five pounds of rosin to one barrel of coal-tar.

We then take equal parts of slaked lime and gypsum, two parts of clay, and six parts of fine sand, and thoroughly mix the same together.

The clay, the lime, and the gypsum, we grind or otherwise pulverize, making the same as fine as flour, and then sift the same before mixing them with the sand.

To the clay, lime, gypsum, and sand, the same having been prepared and mixed as described, we add such a quantity of the mixed coal-tar and rosin that the whole, when thoroughly mixed and boiled, will have the consistency of thick paste.

This mixture must be boiled usually about eight hours, and while boiling must be constantly stirred. If boiled much less than eight hours, the composition is likely to be too soft; if longer, it is likely to be too hard.

The time of boiling varies somewhat with the intensity of the fire, but the skilled workman can readily determine when the boiling should cease.

The composition is to be applied in the usual manner.

The proportions of the several ingredients may be somewhat varied from those given, without materially changing the character of the composition, though we find, from oft-repeated experiments, that it is not advisable to vary therefrom materially.

The composition, when made as above described, does not become brittle when cold, does not become too soft under the action of the sun, and is a durable and valuable roofing composition.

Having thus fully described our invention,

What we claim as new, and desire to secure by Letters Patent, is as follows:

A roofing-composition composed of the substances herein specified, and prepared substantially as described.

S. I. RUSSELL.
JAMES H. COLE.

Witnesses:
E. A. WEST,
O. W. BOND.